United States Patent
Malkamaki

(10) Patent No.: US 7,324,565 B2
(45) Date of Patent: Jan. 29, 2008

(54) METHOD AND DEVICE FOR CHANNEL MULTIPLEXING OR DEMULTIPLEXING

(75) Inventor: Esa Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 10/658,762

(22) Filed: Sep. 10, 2003

(65) Prior Publication Data

US 2004/0228315 A1    Nov. 18, 2004

(30) Foreign Application Priority Data

May 14, 2003    (EP) ................................. 03010850

(51) Int. Cl.
*H04B 7/26*    (2006.01)
*H04J 3/16*    (2006.01)

(52) U.S. Cl. ..................................... 370/535

(58) Field of Classification Search ................ 370/535, 370/537, 542
See application file for complete search history.

(56) References Cited

U.S. PATENT DOCUMENTS 6,996,133 B2 * 2/2006 Bretl et al. ................. 370/535

2005/0281294 A1 * 12/2005 Gaddam et al. ............ 370/535
2006/0246836 A1 * 11/2006 Simon ....................... 455/3.01

FOREIGN PATENT DOCUMENTS

EP    0 805 598 A    11/1997

OTHER PUBLICATIONS

Ericsson: *"On the Use of a Short TTI for Enhanced Uplink DCH"*, TSG-RAN WG1 '31, TDOC R1-030211, vol. 31, Feb. 18, 2003, XP002288648.
"On the Use of a Short TTI for Enhanced Uplink DCH," Ericsson, Document for Discussion, TSG-RAN WG1 #31, R1-030211, Agenda Item 13, Feb. 18-21, 2003.

* cited by examiner

*Primary Examiner*—Melvin Marcelo
(74) *Attorney, Agent, or Firm*—Squire, Sanders & Dempsey, L.L.P.

(57) ABSTRACT

A method and device multiplexes a first transmission channel having a first transmission time interval for data unit transmission and at least one second transmission channel having a second transmission time interval for data unit transmission. A stream of placeholder bits is supplied to a channel multiplexing function of the at least one second transmission channel. The placeholder bits are then replaced at a later stage by an actual data stream of the first transmission channel.

40 Claims, 3 Drawing Sheets

METHOD AND DEVICE FOR CHANNEL MULTIPLEXING OR DEMULTIPLEXING

BACKGROUND OF THE INVENTION

1. Field of the Invention

The invention relates to a method and system for multiplexing or demultiplexing transmission channels of a communication network, e.g. a third generation cellular network.

2. Description of the Related Art

Within the International Telecommunications Union (ITU), several different air interfaces are defined for third generation mobile communication systems, based on either Code Division Multiple Access (CDMA) or Time Division Multiple Access (TDMA) technology. Wideband CDMA (WCDMA) is the main third generation air interface and will be deployed in Europe and Asia, including Japan and Korea, in the same frequency band, around 2 GHz.

WCDMA technology has shaped the WCDMA radio access network architecture due to the requirements of CDMA basic features, such as soft handover which is a category of handover procedures where the radio links are added and abandoned in such a manner that the terminal device, or user equipment (UE) in third generation terms, keeps at least one radio link to the radio access network.

The WCDMA air interface has been defined to provide, in the first phase, data rates up to 2 Mbps in the 3GPP (third generation partnership project) Release 99 and Release 4 specifications. In the Release 5 specification, peak data rates up to 10 Mbps are possible with a high speed downlink packet access (HSDPA) feature to thereby support packet-based multimedia services. In HSDPA, the intelligence of the Node B, which is the third generation equivalent to the former base station, is increased for handling of retransmissions and scheduling functions, thus reducing the roundtrip delay between a mobile device and the network entity handling retransmissions, e.g. the radio network controller (RNC). This makes retransmission combining feasible in the mobile device due to reduced memory requirements. In general, all HSDPA users share the channel in both time and code domains. Adaptive modulation and coding are used to support multiple rate transmissions for different types of multimedia services.

A low client-server round-trip time (RTT) is of great importance for applications based on the Transmission Control Protocol (TCP), where the congestion control mechanisms of TCP limit the data rate as a function of the observed RTT. An RTT which is too large may, in this case, lead to inefficiency in the radio-resource utilization and degraded end-user performance.

In WCDMA systems, the transmission time interval (TTI) is defined as the inter-arrival time of transport block sets, i.e. the time it takes to transmit a transport block set. The transport block set is defined as a set of protocol data units (PDUs) exchanged between the physical layer (L1) and the Medium Access Control (MAC) which is a sublayer of the radio interface layer 2 (L2) providing unacknowledged data transfer service on logical channels and access to transport channels. Shortening the uplink TTI will contribute to an overall client-server RTT reduction. In addition to the obvious reduction in delay from the TTI itself, a reduced TTI allows for reduced processing delays as well. Incoming data to be transmitted need to wait until the start of the next TTI, a waiting time which is shortened with a reduced TTI. Furthermore, the smaller payload resulting from a reduced TTI (assuming unchanged data rate) allows for a reduced processing time in the decoding process. A shorter uplink TTI should allow for a significant uplink-delay reduction while still supporting reasonable payloads.

In the following, the abbreviation "E-DCH" is used to denote a new transport channel type, supporting a shorter TTI of 2 ms. Enhanced uplink DCH (E-DCH) is being studied in 3GPP (Third Generation Partnership Project). The targets are increased cell and user throughput and shorter delay. Possible enhancements studied are fast Node B based scheduling, fast (H)ARQ ((Hybrid) Automatic Repeat Request) between UE and Node B and shorter TTI length, i.e. less than 10 ms. One motivation in the E-DCH to which TTI length is strongly related is to minimize the air interface delay. The selection between the TTI lengths will also depend on which TTI length the multiplexing scheme is possible to design at reasonable increase in complexity, what kind of peak to average power ratio (PAR) it will result in, and what kind of performance it will result, etc. Also the TTI length should be selected in such way that several services can be served simultaneously on E-DCH and DCH, since having several simultaneous services is an essential feature of UTRAN (Universal Mobile Telecommunications System Terrestrial Radio Access Network).

Shorter TTI is easily introduced by having it on a separate code channel, i.e., by code multiplexing it. This, however, increases the PAR in the UE transmitter, which requires more linear power amplifier and makes the power amplifier less efficient. Therefore, it is desirable to time multiplex the new E-DCH(s) having shorter than 10 ms TTI, e.g. 2 ms or 3.3 ms (i.e., 3 or 5 slots, respectively), with the normal DCHs having TTI length of 10 ms or larger, e.g. 10, 20, 40 and 80 ms are currently allowed in the WCDMA specifications. So the problem is, how to time multiplex E-DCH having shorter than 10 ms TTI with DCHs having 10 ms or larger TTI. Furthermore, the solution should be such that legacy Node Bs are still able to decode the normal DCHs in a soft handover (SHO) situation where one or more of the active set Node Bs are legacy Node Bs.

Time-multiplexing proposals have been made e.g. by TSG RAN WG1 Tdoc R1-03-0211 or TSG-RAN WG1 Tdoc R1-03-0274. In both proposals, the time multiplexing of 2 ms TTI with 10 ms TTI was concluded to be relatively complex. In TSG RAN WG1 Tdoc R1-03-0211 it has been proposed to separate 10 ms and 2 ms TTI into different radio frames (10 ms), i.e., in one 10 ms radio frame either 2 ms TTI is used (i.e., 5 TTIs) or multiples of 10 ms TTI. So the time multiplexing is at radio frame level. It was assumed that there is a fixed switching point between 2 ms TTI and 10 ms TTI, which made the time multiplexing complex. In TSG-RAN WG1 Tdoc R1-03-0274 it has been proposed to divide each slot in a semi-static way into two parts, one for DCHs with 10 ms or larger TTI and the other for E-DCH with 2 ms TTI. Semi-static here means that it is configured by higher layers at the beginning of the connection and may be reconfigured by higher layer signaling also later. However, it should be noted that reconfiguration is a quite 'heavy' and slow operation which is not done frame by frame. Moreover, this division often leads to a non-optimal share of channel bits to DCH and E-DCH.

SUMMARY OF THE INVENTION

The invention provides a time multiplexing scheme for multiplexing channels with different TTIs, by means of which fixed switching points can be avoided and the channels can exist simultaneously.

Provided is a method of multiplexing a first transmission channel having a first transmission time interval for data unit transmission and at least one second transmission channel having a second transmission time interval for data unit transmission. The method includes a step of reserving space for the first transmission channel at predetermined positions by supplying a stream of placeholder bits to a channel multiplexing function of the at least one second transmission channel. The method includes the steps of generating a data stream of the first transmission channel and replacing said placeholder bits by said generated data stream of said first transmission channel.

Furthermore, the invention provides a method of demultiplexing a first transmission channel having a first transmission time interval for data unit transmission and at least one second transmission channel having a second transmission time interval for data unit transmission. The method includes the step of deriving at least one of predetermined positions and numbers of data units of the first transmission channel from a receiving signal containing a data stream multiplexed according to a channel multiplexing scheme of the second transmission channel. The method includes the steps of copying from the multiplexed data stream data units located at the determined positions; and processing a data stream of the copied data units according to a processing scheme of the first transmission channel.

Additionally, the invention provides a device for multiplexing a first transmission channel having a first transmission time interval for data unit transmission and at least one second transmission channel having a second transmission time interval for data unit transmission. The device includes a supply means, a generating means and a replacing means. The supply means supplies a stream of placeholder bits to a channel multiplexing function of the at least one second transmission channel. The generating means generates a data stream of the first transmission channel. The replacing means replaces the placeholder bits by the generated data stream of the first transmission channel.

According to another embodiment, the invention provides a device for demultiplexing a first transmission channel having a first transmission time interval for data unit transmission and at least one second transmission channel having a second transmission time interval for data unit transmission. The device includes a deriving means, a copying means and a channel processing means. The deriving means derives at least one of predetermined positions and numbers of data units of the first transmission channel from a received signal containing a data stream multiplexed according to a channel multiplexing scheme of the second transmission channel. The copying means copies from the multiplexed data stream data units located at the determined positions. The channel processing means processes a data stream of the copied data units according to a processing scheme of the first transmission channel.

In connection with the invention, the terms "predetermined position" and "predetermined numbers" are to be understood in the sense that at the beginning of the connection the positions and numbers are agreed between the transmitting end, e.g. the UE, and the receiving end, e.g. the network side. After this, they are predetermined such that the transmitting end can select the transport format combination (TFC) from the agreed TFC set (TFCS). The TFCI is an index pointer to this TFCS and thus tells the positions. These positions are, however, not fixed, i.e. defined in the specification documents relating to the respective standard.

Accordingly, time multiplexing of enhanced transmission channels, e.g. E-DCH, with normal transmission channels, e.g. DCH, can be implemented in an easy manner to shorten the TTI length and optimize PAR, which is important from the power amplifier efficiency point of view. Especially, at low and medium bit rates, approximately up to 384-500 kbit/s, only one multicode channel is needed which minimizes the PAR.

Furthermore, keeping the data rate of the enhanced first transmission channel constant during the second TTI, e.g. 10 ms, and varying it only between the respective radio frames simplifies UE MAC implementation due to the fact that TFC selection and TFC elimination only needs to be operated at normal second TTIs and thus the existing algorithms can be used. Also, the interface between MAC and L1 is possible to operate only once per second TTI, if necessary.

The data stream of the first transmission channel may itself be multiplexed according to a channel multiplexing scheme of the transmission channel.

The first TTI can be smaller than the second TTI. In particular, the length of the second TTI may be an integer multiple of the length of the first TTI. More specifically, the second TTI may have a length of 10 ms and the first TTI may have a length of 2 ms.

Furthermore, the predetermined positions of the placeholder bits or E-DCH indication bits, which are to be replaced by the data units of the first transmission channel may be fixed at least during the length of one second TTI. However, they may vary between different ones of the second TTI. The predetermined positions and numbers can be derived from a transport format information, such as the transport format combination indicator (TFCI) parameter of the second transmission channel, of the multiplexed data stream. Using the normal TFCI to tell the position of the channels, e.g. DCH(s) and E-DCH, allows the invention to use even legacy Node Bs in the active set during soft handover (SHO) to receive the DCH(s) correctly. The legacy Node Bs would naturally not be able to receive E-DCH correctly. This also implies that the E-DCH data rate is constant during the second TTI, e.g. 10 ms (normal TFCI period). In connection with the invention, the term "legacy" is used to indicate those formats, applications, data or devices, which have been inherited from languages, platforms, and techniques earlier than the current technology. Typically, the challenge is to keep the legacy features or applications running or legacy devices supported while converting it to newer, more efficient features or devices that make use of new technology and skills.

The replacing of the placeholder bits may be performed after a final interleaving process, e.g. the second interleaving of a WCDMA DCH channel. The replacing step may be performed by the physical channel mapping function.

The generating step may include at least one of a channel coding step, a channel multiplexing step, a channel segmentation step and an interleaving step.

The enhanced first transmission channel may be a multicode channel, and the number of the placeholder bits may vary on different code channels of the multicode channel.

The data units located at the predetermined positions may be copied but not removed before a first de-interleaving process. Then, the data units located at the predetermined positions can be removed after demultiplexing of the multiplexed data stream. Thereby, it can be assured that the de-interleaving function is not disturbed and works properly.

The multiplexing scheme may be configured to treat the placeholder bits of the first transmission channel as one of the at least one second transmission channels. Then, no change to the multiplexing operation of the normal or conventional second transmission channels is required, since the enhanced first or bunch of first transmission channel(s), e.g. E-DCH(s), is seen by the multiplexing function as one of the conventional second transmission channels, even if the first transmission channels themselves were multiplexed or treated differently within the bunch. This provides the advantage that legacy or old Node Bs can receive at least the conventional second transmission channels, e.g. DCHs, correctly.

The first transmission channel may be an enhanced dedicated WCDMA channel and the second transmission channel may be a dedicated WCDMA channel. More specifically, an enhanced transport format indication information may be provided in the enhanced dedicated WCDMA channel, wherein the enhanced transport format indication information indicates specific information about the structure of the first transmission channel.

BRIEF DESCRIPTION OF THE DRAWINGS

In the following, the invention will be described in greater detail based on preferred embodiments with reference to the accompanying drawings, in which.

DETAILED DESCRIPTION OF THE PREFERRED EMBODIMENTS

Figure 1:
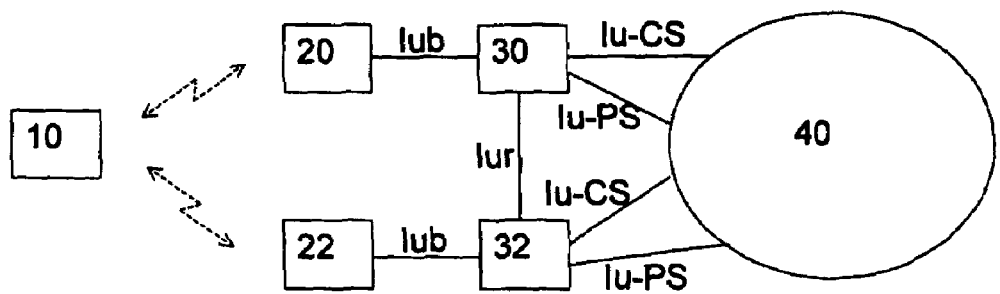
FIG. 1 shows a schematic diagram of one example of a network architecture in which the invention can be implemented.

Examples of the embodiments of the invention will now be described on the basis of a third generation WCDMA radio access network architecture as shown in FIG. 1.

FIG. 1 shows a terminal device or UE 10 connected via an air interface to a first Node B 20 and/or a second Node B 22. The first and second Node Bs 20, 22 are connected via respective Iub interfaces to first and second radio network controllers (RNCs) 30, 32 which are connected to each other via a Iur interface. The Node Bs 20, 22 are logical nodes responsible for radio transmission and reception in one or more cells to/from the UE 10 and terminate the Iub interface towards the respective RNCs 30, 32. The RNCs 30, 32 are in charge of controlling use and integrity of radio resources within the radio access network. Furthermore, the RNCs 30, 32 provide connections to a third generation core network 40, e.g. a UMTS network for both circuit-switched traffic via a Iu-CS interface and packet-switched traffic via a Iu-PS interface. The existence of an open standardized Iur interface is essential for proper network operation, including soft handover support in a multi-vendor environment. It should be noted that in a typical case many Node Bs are connected to the same RNC.

Figure 2:
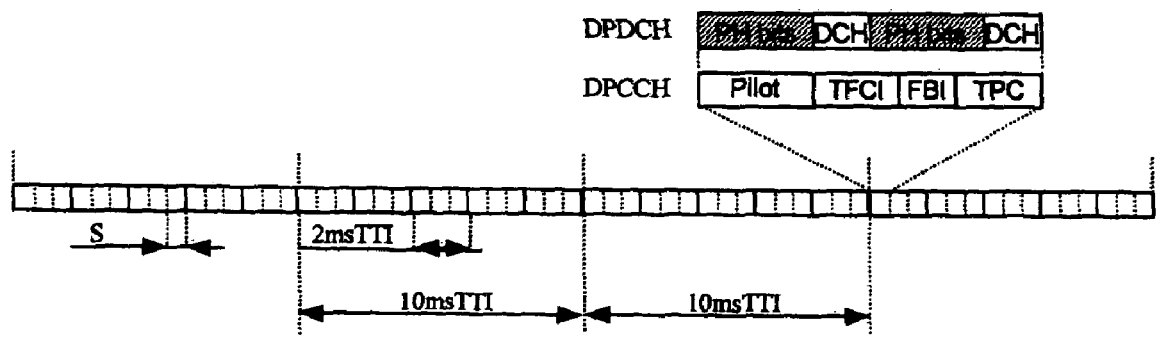
FIG. 2 shows a schematic diagram of a physical channel structure with placeholder bits according to an embodiment of the invention.

FIG. 2 shows schematic diagrams of a physical channel structure after the second interleaving with placeholder bits according to the preferred embodiment, assuming only one dedicated physical data channel (DPDCH). In the WCDMA system, each radio frame, the length of which is 10 ms, includes 15 slots S. In the uplink direction, the data and control part are IQ-multiplexed, i.e., the user data of the DPDCH is transmitted using the I-branch and the control data of the dedicated physical control channel (DPCCH) is transmitted using the Q-branch. Both branches are BPSK (Binary Phase Shift Keying) modulated. FIG. 2 shows both DPDCH and DPCCH parallel. Each DPCCH slot includes two Transport Format Combination Indicator (TFCI) bits which together with TFCI bits from other slots of the frame represent the current transport format combination, i.e. the combination of currently valid transport formats on all transport channels of the concerned UE. In particular, the transport format combination contains one transport format for each transport channel. Furthermore, each DPCCH time slot of the frame structure of the time multiplex transmission signal between the UE 10 and the Node Bs 20, 22 includes a transmit power control command TPC field used for power control function as well as the TFCI bits described above, and a feedback information (FBI) field. The uplink DPDCH field only contains data bits, typically from many transport channels. Further details concerning the WCDMA frame structure are described in the 3GPP specifications TS 25.211 and 25.212.

According to the examples of the invention, so called 'placeholder bits' (PH bits) or E-DCH indication bits are supplied or added into the normal transport channel (TRCH) multiplexing in order to reserve space for the E-DCH bits, which are added e.g. after the second interleaving. The E-DCH bits then replace the placeholder bits. In the receiver, e.g. Node B, the E-DCH samples are then extracted or copied, e.g. before the 10 ms de-interleaving, and processed separately. The word samples is used here to emphasize that the received bits are typically represented as soft values before channel decoding. It should be noted that the E-DCH samples are not removed before de-interleaving. Otherwise, the de-interleaving would not work properly. The E-DCH samples might however be replaced with some dummy samples. The added E-DCH samples may be removed after TrCH demultiplexing. The normal TFCI field may then tell the position of DCH samples and E-DCH samples within the 10 ms radio frame as well as within each slot S. Since a normal TFCI field is used, the number of PH bits (or E-DCH bits) in each 2 ms TTI within one radio frame (10 ms) are typically the same. If the number of PH bits is not a multiple of 15, there can be slightly different number of PH bits in different slots due to the interleaving. For the same reason, the number of PH bits in different 2 ms TTIs may be different. In the preferred embodiment the number of PH bits is selected to be a multiple of 15, so that there are equal number of PH bits in each slot. Due to rate matching parameters this may not always be possible. Even if the number of PH bits is not exactly the same in each slot, the number of bits is known and TFCI or E-TFCI, to be explained later, tells that.

FIG. 2 shows an example where the placeholder bits are located in each slot. Due to the WCDMA second interleaving, the PH bits are in two parts in each slot. The position of the PH bits in the beginning of the first and second half of the slot means that E-DCH PH bits are handled as the first transport channel in TrCH multiplexing. In principle, the PH bits can be handled as any of the transport channels (TrCH) in the multiplexing, thus putting the PH bits either at the beginning, in the middle or at the end of each half slot. In the preferred embodiment, the position is selected to be at the beginning of each slot.

In principle, the PH bits can be anywhere within the frame if the multiplexing and interleaving functions were different. For instance, the PH bits can be in every third slot, e.g., in the first, fourth, seventh, tenth, and thirteenth slot of each radio frame. As the 2 ms TTI of the E-DCH channel corresponds to three time slots S, E-DCH bits are then provided in one time slot of each 2 ms TTI. Of course, other slot allocations can be implemented for the E-DCH bits.

An important idea is to handle the E-DCH PH bits as a normal TrCH in the TrCH multiplexing function. Thus, there is no need to adapt the existing transport channel multiplexing so as to insert the E-DCH placeholder bits to indicate E-DCH bit positions on the Coded Composite Transport Channel (CCTrCH). This has also the advantage that the DCH bits are on the same positions where they were if E-DCH had 10 ms TTI and were multiplexed in the normal way. If the UE is in SHO such that some of the Node Bs in the active set is a legacy Node B, then even this legacy Node B can decode the normal DCHs. The PH bits can be replaced by the real E-DCH bits e.g. after the second interleaving.

It is also possible to use the normal TFCI information to decode the E-DCH(s), too. Since the normal TFCI is interleaved over 10 ms, the decoding of the E-DCH(s) in this case can only be started after the TFCI has been decoded. This typically causes some extra delay. In order to get the full delay benefit of the shorter TTI (e.g., 2 ms), a new TFCI, called, e.g., E-TFCI is required, since the normal TFCI is available only after 10 ms (TTI of the conventional DCH). To allow decoding within a shorter time period, the E-TFCI should be provided in known positions for each 2 ms TTI. If the TFC were always fixed over 10 ms radio frame, less E-TFCI signaling would be required, e.g., only one E-TFCI would be needed for each 10 ms radio frame, which may be sent during the first 2 ms TTI. The normal TFCI of the DCH channel can tell the number and position of PH bits, which is fixed over the 10 ms frame, but which could vary between different 10 ms frames. The legacy Node Bs use the conventional TFCI to decode the conventional DCHs. The new E-TFCI can contain the same information as the normal or conventional TFCI and in addition possible information about the fine structure of the E-DCH channels(s) which is not needed by the legacy Node Bs, since they are not able to decode the E-DCH. As an option, E-TFCI can be time-multiplexed with E-DCH, e.g., as a new TrCH terminated in a Node B as shown by the dashed line in FIG. 3. Thus the E-TFCI bits would replace some of the PH bits. The E-TFCI bits could, e.g., always be the first bits in each half slot. Another option is to code-multiplex the E-TFCI bits on a separate code channel. This option would, however, increase the PAR somewhat.

Figure 3:
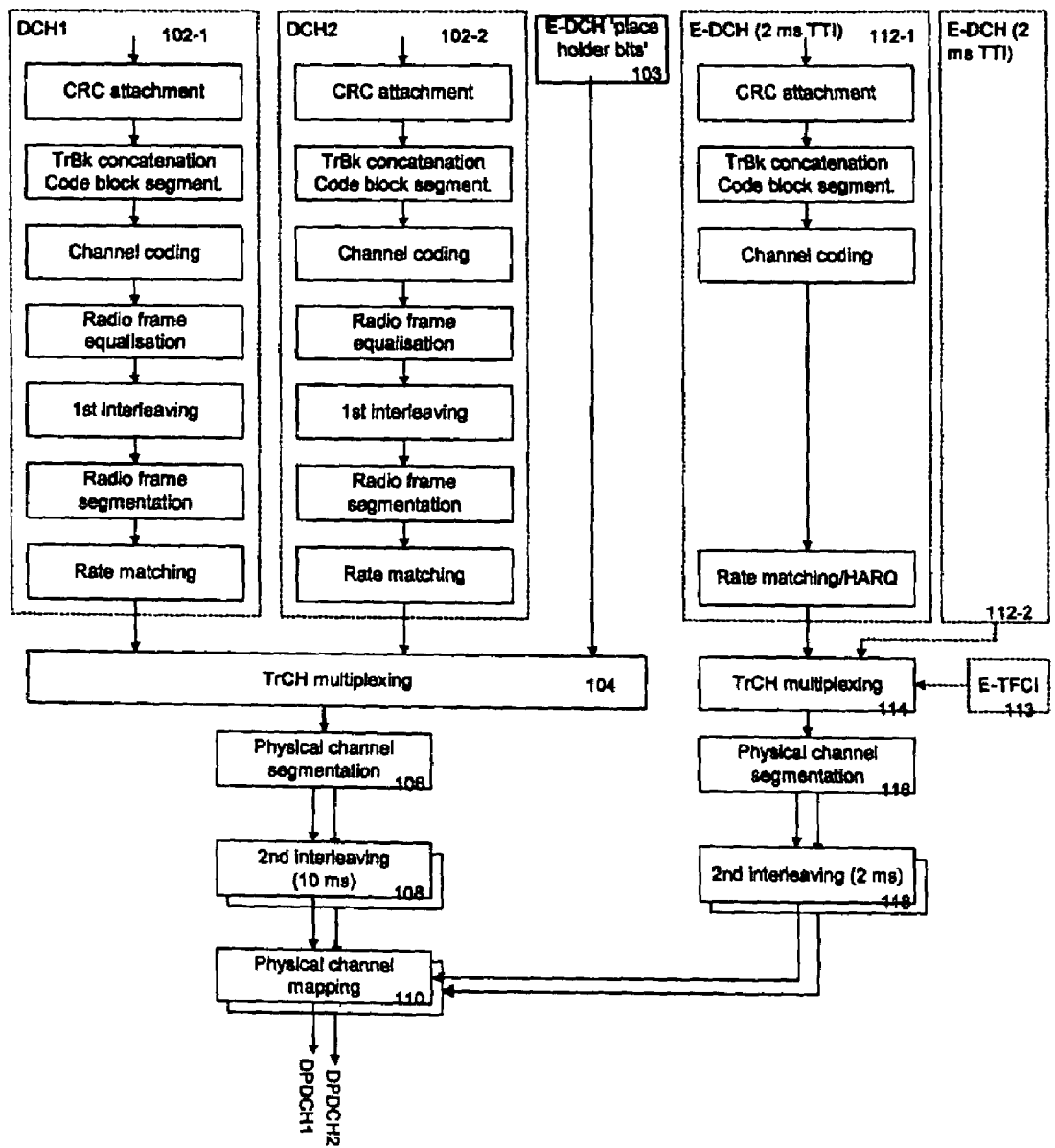
FIG. 3 shows a schematic block diagram of a transport channel multiplexing structure at a transmitting end of an uplink direction, according to an embodiment of the invention.

FIG. 3 shows a schematic diagram of an example of a WCDMA transport channel multiplexing structure for the uplink direction with two conventional DCH channels DCH1 and DCH2 and one enhanced transport channel E-DCH, as provided in a transmitting entity, e.g. the UE 10. An optional second E-DCH is shown as a dashed box 112-2. According to this multiplexing structure, channel signals obtained from individual channel processing stages 102-1 and 102-2 of the two conventional channels DCH1 and DCH2 are multiplexed at a transport channel (TrCH) multiplexing unit 104 together with a stream of E-DCH PH bits generated in a corresponding bit generator functionality 103 which may be a simple bit setting functionality. The number of the E-DCH PH bits is the same as the number of the E-DCH bits plus possible control bits, such as E-TFCI or outband signaling bits for HARQ. The multiplex signal is then processed in a physical channel segmentation unit 106. The segmented physical channel signals are supplied to a 10 ms second interleaving unit 108 and a physical channel mapping unit 110 before being processed for transmission in a transmission unit (not shown).

According to an embodiment of the invention, the E-DCH channel processing scheme includes a separate coding and multiplexing chain having blocks 112, 114, 116 and 118 in FIG. 3. The E-DCH(s) are first channel coded separately in a channel coding unit 112. In the channel coding unit 112, a CRC (Cyclic Redundancy Code) is added or attached, transport blocks are concatenated and code blocks segmented if needed, channel coded either with turbo code or with convolutional code and rate matched (which in this case may be HARQ specific, i.e., take into account different redundancy version). Then, the channel coded E-DCH data stream is supplied to an optional TrCH multiplexing unit 114 for E-DCH transport channels if there are more than one E-DCH channels. This same multiplexing can be used to time multiplex also E-DCH related control, such as outband information for HARQ or E-TFCI generated in corresponding E-TFCI generator functionality 113. This TrCH multiplexing is performed every 2 ms, i.e., once for each E-DCH TTI. After multiplexing, the bits are segmented to different physical channels, if the data rate is so high that multicode is required, in a physical channel segmentation unit 116 and finally interleaved over 2 ms in a second interleaving unit 118. In the case of multicodes, typically there are different number of E-DCH bits on different code channels which has to be taken into account. The number of E-DCH bits on each code channel is, however, always known before. It is defined by the TFC parameter and thus signaled in TFCI and/or E-TFCI. For this same reason, the 2 ms interleavers of the second interleaving unit 118 are also typically of different size. They can however have the same structure as the conventional Release 99 interleavers, i.e., block interleavers with fixed number of columns, e.g. 6 columns if TTI is 2 ms, and variable number of rows.

The physical channel mapping unit 110 is enhanced by a replacing functionality for replacing the E-DCH PH bits with the real E-DCH bits or with E-DCH related control bits time multiplexed with E-DCH. The positions of the PH bits is known based on an information derived from the normal TFCI which tells the number and position of the PH bits. E-TFCI may contain the same information as normal TFCI and in addition possible fine structure of E-DCH(s).

It is noted that the shorter TTI can have any value smaller than 10 ms. Possible values are e.g. 2 ms corresponding to 3 slots S, and 3.33 ms corresponding to 5 slots S. In this example, these possible values should be submultiples of 10 ms corresponding to 15 slots. In other words, the 10 ms TTI should be an integer multiple of the shorter TTI.

Figure 4:
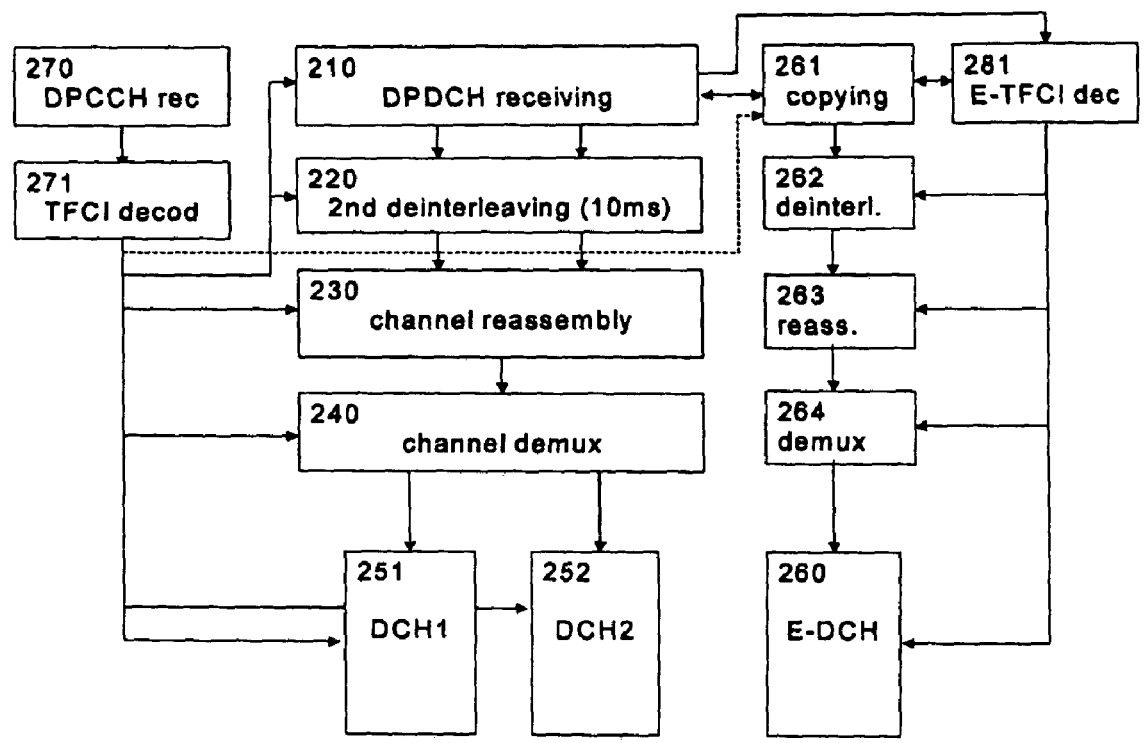
FIG. 4 shows a schematic block diagram of a channel demultiplexing structure at a receiving end of an uplink direction, according to an embodiment of the invention.

FIG. 4 shows a demultiplexing structure for demultiplexing the received time multiplex signal at a receiving entity, e.g. one of the Node Bs 20, 22. The demultiplexing structure comprises a receiving unit 210 for receiving physical channel signals I and Q of the time multiplex signal and supplying the physical channel signals to a second de-interleaving stage 220 for performing a deinterleaving function so as to remove the distribution caused by the second interleaving function of the multiplexing structure of FIG. 3. The de-interleaved physical channel signals are supplied to a physical channel reassembly function 230 in which a single physical channel signal is generated from the received physical channel signals and supplied to a transport channel demultiplexing function 240. There, demultiplexed individual transport channel signals are generated and supplied to individual transport channel processing units 251 and 252 for the DCH channels DCH1 and DCH2. At each transport channel processing unit, the demultiplexed transport channel signal is supplied successively to a rate matching function, frame reassembly function, first de-interleaving function which removes the data distribution caused by a first interleaving function at the respective channel processing unit of the multiplexing structure of FIG. 3, and a channel decoding function.

FIG. 4 also shows a DPCCH receiving unit 270 for receiving the DPCCH physical channel. The TFCI bits from the TFCI fields of the DPCCH slots, as shown in FIG. 2, are decoded in a TFCI decoding unit 271. The TFCI indicates that the TFC used in this radio frame. The TFCI information is used in the DPDCH receiving unit 210, in the second de-interleaving stage 220, in the channel reassembly function 230, in the channel demultiplexing function 240 as well as in the individual transport channel processing units 251 and 252. This information may also be used in processing of E-DCH as shown by the dashed arrow from the TFCI decoding unit 271 to an E-DCH samples extracting or copying unit 261. In fact, there could as well be other arrows directed also to other E-DCH processing units, i.e. boxes 262, 263, 264, and 260, which are not shown in FIG. 4. The TFCI information can also be obtained from the E-TFCI, which as described earlier can be either time or code multiplexed with the E-DCH data bits.

According to an embodiment of the invention, an E-TFCI decoding unit 281 receives or extracts and decodes the E-TFCI bits, e.g. from the DPDCH receiving unit 210 or the copying unit 261 which might have extracted the E-TFCI bits based on the TFCI supplied from the TFCI decoding unit 271, and provides the E-TFCI information to other E-DCH processing units. Based on this E-TFCI, the location and the number of the E-DCH samples is supplied to the copying unit 261 which then copies or extracts the E-DCH samples from the respective transmission channel or transmission channel portion based on the derived information. In particular, the E-DCH samples are copied or extracted before the 10 ms de-interleaving of the second de-interleaving stage 220. As already mentioned, the E-DCH samples should not be removed before de-interleaving, to ensure proper de-interleaving, or they may be replaced with some dummy samples. The E-DCH samples or the dummy samples replacing them can be removed after TrCH demultiplexing, e.g. by the transport channel demultiplexing function 240. The copied E-DCH samples are then supplied to an E-DCH de-interleaving unit 262, which performs the reverse operation of the E-DCH interleaving unit 118 of FIG. 3. The de-interleaved samples are supplied to an optional E-DCH reassembly function 263, which reassembles the samples from several physical channels if present (reverse operation of physical channel segmentation unit 106 in FIG. 3). The samples are de-multiplexed into several individual E-DCH transport channels in an E-DCH TrCH de-multiplexing unit 264 and the samples are supplied to a transport channel processing unit 260 which function basically corresponds to the transport channel processing units 251 and 252. In the E-DCH transport channel processing unit 260 a reverse operation of the E-DCH channel coding unit 112 is performed. The more detailed information about the fine structure of the E-DCH channels can be derived from the E-TFCI parameter. The 2 ms transport channel de-multiplexing unit 264 also de-multiplexes the samples of possible E-DCH related control bits, e.g. such as outband information for HARQ.

It is noted that the TFCI and E-TFCI can be the same. The conventional TFCI tells at least the full transport formats (TFs) of all DCHs, i.e. TrCHs with TTI of 10 ms or larger, and at least the 'transport format' of the 'bunch' of E-DCHs and E-DCH related time multiplexed control data. The E-TFCI tells the transport formats of E-DCHs and related control data and at least the 'transport format' of the 'bunch' of DCHs. To illustrate this, it is assumed that three DCHs (DCH1, DCH2 and DCH3) and two E-DCHs (E.DCH1 and E-DCH2) plus one E-DCH control stream are provided. Then, the TFCI tells the TF of DCH1, the TF of DCH2, the TF of DCH3 and a combined TF of E-DCH1 and E-DCH2 and E-DCH control. In particular, the combined TF tells at least the total number of bits, but not necessarily channel coding details etc. The E-TFCI tells a combined TF of DCH1 and DCH2 and DCH3, i.e. at least the total number of bits, the full TF of E-DCH1, the full TF of E-DCH2 and the full TF of the E-DCH control stream. But, as mentioned earlier both TFCI and E-TFCI can contain full TF for all transport channels.

It is noted that the invention is not restricted to the above preferred embodiments but can be used in any transmission channel multiplexing function so as to multiplex data or control channels of different frame lengths or transmission time intervals. The PH bits may be provided at any suitable fixed or variable location within the channel structure. The preferred embodiments may thus vary within the scope of the attached claims.

The invention claimed is:

1. A method of multiplexing a first transmission channel having a first transmission time interval for data unit transmission and at least one second transmission channel having a second transmission time interval for data unit transmission, said method comprising:
reserving space for a first transmission channel at predetermined positions by supplying a stream of placeholder bits to a channel multiplexing function of at least one second transmission channel;
generating a data stream of said first transmission channel; and
replacing said placeholder bits by said generated data stream of said first transmission channel.

2. A method of demultiplexing a first transmission channel having a first transmission time interval for data unit transmission and at least one second transmission channel having a second transmission time interval for data unit transmission, said method comprising:
deriving at least one of predetermined positions and numbers of data units of a first transmission channel from a receiving signal containing a data stream multiplexed according to a channel multiplexing scheme of a second transmission channel;
copying from said multiplexed data stream data units located at said predetermined positions; and
processing a data stream of said copied data units according to a processing scheme of said first transmission channel.

3. A method according to claim 1, wherein said reserving comprises:
multiplexing said data stream of said first transmission channel according to a channel multiplexing scheme of said first transmission channel.

4. A method according to claim 1, further comprising:
selecting the first transmission time interval to be smaller than the second transmission time interval of said at least one second transmission channel.

5. A method according to claim 4, wherein said selecting comprises selecting a length of said second transmission time interval to be an integer multiple of a length of said first transmission time interval.

6. A method according to claim 5, wherein said selecting comprises selecting said second transmission time interval so as to have a length of 10 ms and said first transmission time interval so as to have a length of 2 ms.

7. A method according to claim 1, wherein said reserving comprises fixing said predetermined positions during a length of one second transmission time interval of said at least one second transmission channel.

8. A method according to claim 7, wherein said reserving comprises varying said predetermined positions between different positions of said second transmission time interval.

9. A method according to claim 2, wherein said deriving comprises deriving said at least one of said predetermined positions and numbers from a transport format information of said multiplexed data stream.

10. A method according to claim 9, wherein said deriving comprises deriving said at least one of said predetermined positions and numbers from said transport format information comprising transport format combination index parameter used at least partly for said second transmission channel.

11. A method according to claim 1, wherein said replacing is performed after a final interleaving process.

12. A method according to claim 11, wherein said replacing is performed by a physical channel mapping function.

13. A method according to claim 1, wherein said generating comprises at least one of a channel coding, a channel multiplexing, a channel segmentation step and an interleaving.

14. A method according to claim 13, wherein the reserving comprises reserving space for said first transmission channel comprising a multicode channel, and the reserving comprises varying the number of said placeholder bits on different code channels of a multicode channel.

15. A method according to claim 2, wherein said copying comprises copying said data units located at said predetermined positions before a first de-interleaving process.

16. A method according to claim 15, further comprising:
removing said data units located at said predetermined positions after demultiplexing of said multiplexed data stream.

17. A method according to claim 1, wherein said reserving comprises reserving space for said first transmission channel comprising an enhanced dedicated wideband code division multiple access channel and said second transmission channel comprising a dedicated wideband code division multiple access channel.

18. A method according to claim 17, wherein said reserving comprises reserving space for said first transmission channel comprising said enhanced dedicated wideband code division multiple access channel having an enhanced transport format indication information channel, said enhanced transport format indication information indicating specific information about the structure of said first transmission channel.

19. A method according to claim 1, further comprising:
treating said placeholder bits of said first transmission channel as one of said at least one second transmission channels.

20. A device for multiplexing a first transmission channel having a first transmission time interval for data unit transmission and at least one second transmission channel having a second transmission time interval for data unit transmission, said device comprising:
a supply unit configured to supply a stream of placeholder bits, including a predetermined positions for the first transmission channel, to a channel multiplexing function of at least one second transmission channel;
a generating unit configured to generate a data stream of a first transmission channel; and
a replacing unit configured to replace said placeholder bits by said generated data stream of said first transmission channel.

21. A device for demultiplexing a first transmission channel having a first transmission time interval for data unit transmission and at least one second transmission channel having a second transmission time interval for data unit transmission, said device comprising:
a deriving unit configured to derive at least one of predetermined positions and numbers of data units of a first transmission channel from a receiving signal containing a data stream multiplexed according to a channel multiplexing scheme of a second transmission channel;
a copying unit configured to copy from said multiplexed data stream data units located at said predetermined positions; and
a channel unit configured to process a data stream of said copied data units according to a processing scheme of said first transmission channel.

22. A device according to claim 20, wherein said first transmission channel having a first transmission time interval is smaller than a second transmission time interval of said at least one second transmission channel.

23. A device according to claim 21, wherein said first transmission channel having a first transmission time interval is smaller than a second transmission time interval of said at least one second transmission channel.

24. A device according to claim 20, wherein said predetermined positions are fixed during length of one second transmission time interval of said at least one second transmission channel.

25. A device according to claim 24, wherein said predetermined positions vary between different positions of a second transmission time interval of said at least one second transmission channel.

26. A device according to claim 21, wherein said deriving unit is configured to derive at least one of said predetermined positions and numbers from a transport format information of said receiving signal.

27. A device according to claim 26, wherein said transport format information comprises a transparent format combination index parameter used at least partly for said second transmission channel.

28. A device according to claim 20, wherein said replacing unit is arranged after a final interleaving functionality.

29. A device according to claim 28, wherein said replacing unit comprises a physical channel mapping functionality.

30. A device according to claim 20, wherein said generating unit comprises at least one of a channel coding functionality, a channel multiplexing functionality, a channel segmentation functionality and an interleaving functionality.

31. A device according to claim 20, wherein said first transmission channel comprises a multicode channel, and said device is configured to vary the number of said placeholder bits on different code channels of said multicode channel.

32. A device according to claim 21, wherein said copying unit is configured to copy said data units at said predetermined positions before the data units are supplied to a first de-interleaving process.

33. A device according to claim 32, further comprising:
removing unit configured to remove said data units located at said predetermined positions after demultiplexing of said multiplexed data stream.

34. A device according to claim 20, wherein said first transmission channel comprises an enhanced dedicated wideband code division multiple access channel and said second transmission channel comprises a dedicated wideband code division multiple access channel.

35. A device according to claim 21, wherein said first transmission channel comprises an enhanced dedicated wideband code division multiple access channel and said second transmission channel comprises a dedicated wideband code division multiple access channel.

36. A device according to claim 20, wherein said multiplexing device comprises a mobile terminal.

37. A device according to claim 21, wherein said demultiplexing device comprises a Node B device.

38. A device according to claim 20, wherein said multiplexing device is configured to treat said placeholder bits of the first transmission channel as one of said at least one second transmission channels.

39. A device for multiplexing a first transmission channel having a first transmission time interval for data unit transmission and at least one second transmission channel having a second transmission time interval for data unit transmission, said device comprising:

supply means for supplying a stream of placeholder bits, including a predetermined position for the first transmission channel, to a channel multiplexing function of at least one second transmission channel;

generating means for generating a data stream of a first transmission channel; and replacing means for replacing said placeholder bits by said generated data stream of said first transmission channel.

40. A device for demultiplexing a first transmission channel having a first transmission time interval for data unit transmission and at least one second transmission channel having a second transmission time interval for data unit transmission, said device comprising:

deriving means for deriving at least one of predetermined positions and numbers of data units of a first transmission channel from a receiving signal containing a data stream multiplexed according to a channel multiplexing scheme of a second transmission channel;

copying means for copying from said multiplexed data stream data units located at said predetermined positions; and channel processing means for processing a data stream of said copied data units according to a processing scheme of said first transmission channel.

\* \* \* \* \*